United States Patent
Belart

[15] 3,683,619
[45] Aug. 15, 1972

[54] BOOSTER SYSTEM
[72] Inventor: Juan Belart, Walldorf, Germany
[73] Assignee: ITT Industries, Inc., New York, N.Y.
[22] Filed: Jan. 11, 1971
[21] Appl. No.: 105,556

[30] Foreign Application Priority Data

Jan. 31, 1970    Germany..........P 20 04 502.7
Feb. 13, 1970    Germany..........P 20 06 576.3

[52] U.S. Cl. .............................60/54.6 P, 188/359
[51] Int. Cl. .....................................F15b 7/00
[58] Field of Search.............................60/54.5, 54.6

[56] References Cited

UNITED STATES PATENTS

| | | |
|---|---|---|
| 3,143,928 | 8/1964 | Wahlstrom..............91/391 R |
| 2,904,960 | 9/1959 | Aikman..................60/54.6 P |
| 2,499,775 | 3/1950 | Piganean................60/54.5 P |
| 2,964,909 | 12/1960 | Garrison.................60/54.6 P |

Primary Examiner—Martin P. Schwadron
Assistant Examiner—A. M. Zupcic
Attorney—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A pressure master cylinder and a booster device are interconnected by pressure medium lines. The master cylinder includes an actuating piston having internally thereof a pressure medium cylinder and a control piston actuated by a brake pedal. When the brake pedal is depressed the control piston applies pressure to the pressure medium cylinder which in turn actuates the actuating piston. The pressure medium of the pressure medium cylinder actuates the booster device which in turn applies further actuating pressure to the actuating piston. The control piston is constructed so that failure in the booster device or the interconnecting pressure medium lines will enable the control piston to displace the actuating piston by physical contact to apply braking pressure to the one or more braking circuits connected to the master cylinder.

14 Claims, 4 Drawing Figures

Inventor
JUAN BELART
By Alfred C. Hill
Agent

Inventor
JUAN BELART
By Alfred C. Hill
Agent

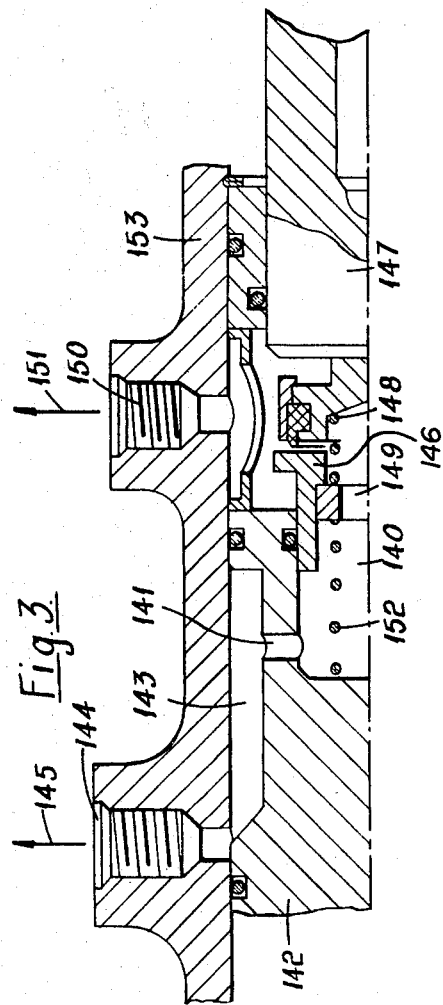
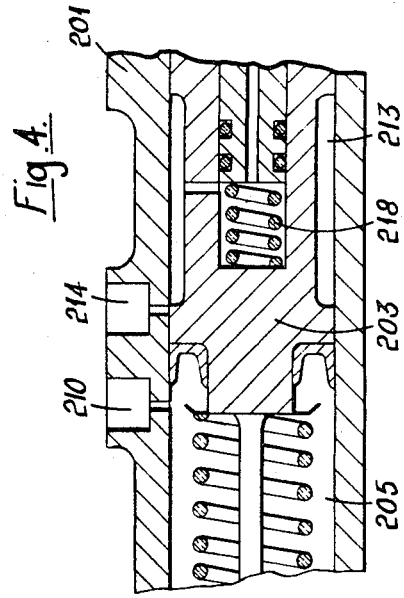
Inventor
JUAN BELART
By Alfred C. Hill
Agent

BOOSTER SYSTEM

BACKGROUND OF THE INVENTION

The invention relates to a booster system comprising a pressure master cylinder and a booster device, particularly for brake systems in vehicles, the master cylinder being connected with the booster device via pressure medium lines.

Booster systems are already known consisting of a master cylinder which is applied with pressure by the brake pedal, said master cylinder being connected both to a slave pressure medium cylinder via a pressure medium line, said slave cylinder being flanged or connected to the booster, and to a valve device controlling the booster via a pressure medium line. The piston of the booster acting upon the actuating piston of the slave cylinder from which one or several brake lines lead to the various braking units. The use of these boosters systems allows a locally separate arrangement of master cylinder and booster in a vehicle. This, however, is a disadvantage in that the brake system is put completely out of function if there is a defect in the pressure medium lines extending from the master cylinder to the booster.

There has been a proposal to design the aforementioned booster system as a dual circuit system such that the master cylinder and the slave cylinder are designed as a tandem cylinder and that the pressure medium lines branching off at the tandem master cylinder are connected via the tandem slave cylinder with the valve assembly controlling the booster, said valve assembly being actuated via pressure medium lines of the two-circuit system which act independently from each other. This known system is very expensive because of its intricate and complex design.

Furthermore, this system has the disadvantage that, upon failure of one of the pressure medium lines leading from the tandem master cylinder to the booster, the stroke of the piston disposed in the master cylinder and connected to the failed pressure medium line, has to be overcome in order to build up pressure in the tandem master cylinder.

SUMMARY OF THE INVENTION

An object of the present invention is to provide a brake system of the type described with a booster device which is free from the disadvantages of the system described above.

Another object of the present invention is to provide a booster system which applies a reaction force on the brake pedal upon actuation of the booster system to enable the driver to sensitively proportion the brake force required for the braking process.

Still another object of the present invention is to provide a brake booster system of simple design and having moderate costs of manufacture.

A feature of the present invention is the provision of a booster system for brake systems in vehicles comprising a brake pedal; a pressure master cylinder; a booster device having at least one output; a plurality of pressure medium lines interconnecting the master cylinder and the booster device; and at least one brake circuit coupled to the master cylinder; the master cylinder including an actuating piston having internally thereof a pressure medium cylinder and a control piston coupled to the brake pedal, the actuating piston having pressure applied thereto by at least said output of said booster device in a given direction and simultaneously the control piston is moved by the brake pedal against the pressure medium of the pressure medium cylinder in the given direction to actuate the brake circuit, the pressure medium of the pressure medium cylinder being coupled by one of the plurality of pressure medium lines for actuation of the booster device, the control piston coming into direct contact with the actuating piston for actuation thereof when any of the plurality of pressure medium lines and/or the booster device fails.

According to the invention this task is solved in that the brake circuit is connected with a master cylinder whose actuating piston is applied with pressure in the direction of actuation thereof by the booster system while the control piston moved by the brake pedal acts on a pressure medium slave cylinder via means provided therefore, and the pressure medium column of said slave cylinder actuating via a line the valve which actuates the booster system. Upon failure of the booster system the control piston at its point of control will come into direct contact with the actuating piston for subsequently displacement.

According to the invention a spring is disposed between the control piston and the actuating piston.

In an embodiment of the invention the control piston is of stepped design.

A further feature of the present invention is the provision of the pressure medium cylinder being connected with a pressure medium supply tank via a compensating bore and a circular duct surrounding the actuating piston between the actuating piston and the housing of the master cylinder.

According to still a further feature of the invention the pressure medium cylinder is connected with the pressure medium line to actuate the booster device via an axial bore and a radial bore provided in the control piston and via an annular chamber located between the control piston and the housing of the pressure master cylinder.

According to the invention the actuating piston can be applied with pressure by the pressure medium coming from the booster device and/or by the larger portion of the control piston.

In a preferred embodiment of the present invention the control piston is designed in two pieces with a spring being disposed between the one piece and the other piece, said spring separating the pieces during rest position of the booster system.

It is a further feature of the preferred embodiment of the present invention that when the pieces are separated from each other the pressure medium of the pressure medium cylinder is connected to the output of the booster device via the bore provided in the control piston.

One embodiment of the present invention provides a connection between the pressure medium cylinder and the booster device for actuation thereof via radial bores in the actuating piston, an annular chamber surrounding the actuating piston between the actuating piston and the housing of the master cylinder, a pressure medium outlet provided within the area of the mentioned annular chamber, and a subsequent pressure medium line.

According to the invention the pressure medium line leading to the pressure medium cylinder can be applied with pressure by the pressure medium in the booster device or the pressure medium in the supply tank.

The advantages achieved by means of the present invention are that, upon failure of the booster circuit and upon actuation of the master cylinder by the brake pedal, brake pressure as required for braking of the vehicle can be built up in the brake circuit or brake circuits.

BRIEF DESCRIPTION OF THE DRAWING

Above-mentioned and other features of objects of this invention will become more apparent by reference to the following description taken in conjunction with the accompanying drawing in which:

FIG. 3 is a longitudinal cross-sectional view of a pressure cylinder in accordance with the principles of the present invention having a divided control piston; and FIG. 4 is a longitudinal cross-sectional view of a pressure master cylinder in accordance with the principles of the present invention having a separate pressure medium connection for the pressure medium cylinder contained in the actuating piston.

DESCRIPTION OF THE PREFERRED EMBODIMENTS

Figure 1:
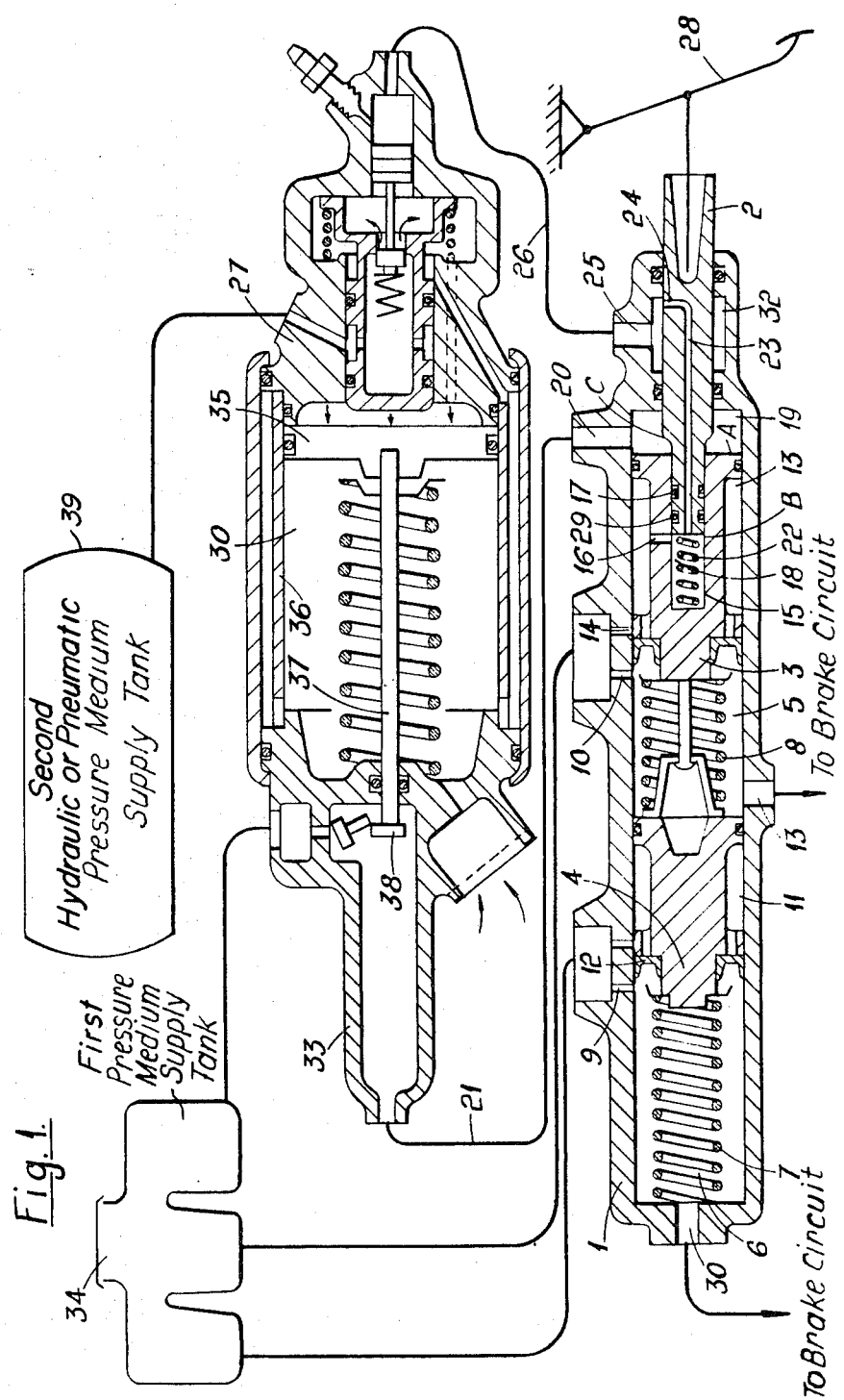
FIG. 1 is a longitudinal cross-sectional view of a booster system in accordance with the principles of the present invention having a pressure master cylinder with stepped control piston.

In FIG. 1, the pressure master cylinder 1 is designed as a tandem master cylinder including control piston 2, which is designed as a stepped piston, has pressure applied thereto by the brake pedal 28, the actuating piston 3, the floating piston 4, the pressure medium chamber 5 for the actuating piston 3, and the pressure medium chamber 6 for the floating piston 4. Compression springs 7 and 8 are provided in the pressure medium chambers 5 and 6 for the return of the floating piston 4 and the actuating piston 3 into initial position after termination of the braking process. The compensating bore 9 connects the pressure medium chamber 6 with a pressure medium supply tank 34, whereas the pressure medium chamber 5 is connected with supply tank 34 via the compensating bore 10. The annular duct 11 surrounding the floating piston 4 is connected with supply tank 34 via the feed bore 12 whereas the annular duct 13 of the actuating piston 3 is connected with supply tank 34 via the feed bore 14.

The actuating piston 3 is provided with an axial cylinder bore 15, the latter being connected with the annular duct 13 via the compensating bore 16 and the smaller portion of the control piston 2 projecting into said axial cylinder bore 15. A seal 17 is provided on the outer surface of the smaller portion of the control piston 2 which seal the pressure medium cylinder 18 of the cylinder bore 15 with respect to the cylinder chamber 19, the latter being formed by the housing of the pressure master cylinder 1 the actuating piston 3 and control piston 2 communicates chamber 19 with the output of a booster device 30 via the pressure medium connection 20 and the pressure medium line 21. A compression spring 22 is disposed in cylinder 18, said spring having an end bearing against the actuating piston 3 and the other end bearing against the face of the control piston 2. Cylinder 18 is connected to the pressure medium outlet 25 via the axial longitudinal bore 23 and the radial bore 24, which bores are disposed in the smaller and larger portions of the control piston 2, said smaller portion being slidably engaged in the cylinder 18. A pressure medium line 26 extends from the pressure medium outlet 25 to the valve 27 controlling the actuation of booster 30.

By actuation of the brake pedal 28, the smaller portion of the control piston 2 is displaced and thus projects into the cylinder 18. The seal 29 arranged in front of the piston then slides over the compensating bore 16 and thus interrupts the pressure medium connection to the first supply tank 34. The pressure which is now built up in cylinder 18 actuates valve 27 via longitudinal bore 23, radial bore 24 and the pressure medium line 26 such that pressure medium is fed by the booster device 30 into the cylinder chamber 19 of the pressure master cylinder 1 via the pressure medium line 21. The pressure medium coming from the booster device 30 applies pressure to the annular face of the actuating piston 3 as well as the annular face of the larger portion of the control piston 2. The actuating piston 3 and the floating piston 4 are then displaced in the direction of actuation in order to feed the pressure medium in the pressure medium chambers 5 and 6 via the pressure medium outlets 30 and 31 into the individual brake circuits subsequent to the sliding of pistons 3 and 4 over the compensating bores 9 and 10. During these movements the control piston 2 follows the actuating piston 3 due to the force exerted on the brake pedal, and thus maintains the pressure of the pressure medium in the cylinder 18 whereby closing of the valve 27 is prevented. To ensure that the radial bore 24 is permanently connected with the pressure medium outlet 25, an annular duct 32 has been provided coextensive with the stroke of the actuating piston 2 in the housing 1 of the pressure master cylinder.

The pressure medium fed into the cylinder chamber 19 by the booster device 30 applies pressure to the annular face A of actuating piston 3 and the annular face C of control piston 2. The face B of control piston 2 has control pressure applied thereto by the pressure generated in cylinder 18. These reaction forces acting on the faces B and C against the actuating force, initiated by the brake pedal, enable the driver to proportion the brake force as required for the braking process.

After termination of the braking process control piston 2 is first of all returned to its initial position by the above-mentioned reaction forces and the compression spring 22 disposed in cylinder 18. The pressure medium in the cylinder 18 then expands and the compensating bore 16 is opened. The valve 27 closes in dependence on the expansion of the pressure medium in cylinder 18. Subsequent to the sliding of the seal 29 of the stepped piston 2 over the compensating bore 16 there is achieved a full compensation of pressure between the pressure medium contained in cylinder 18 and the pressure medium in the supply tank 34. The valve 27 closes completely and thus shuts off the pressure medium supply from the booster device 30 to cylinder chamber 19. The floating piston 4 and the actuating piston 3 are returned to their initial positions by compression springs 7 and 8. During this operation the pressure medium in the cylinder chamber 19 is redirected to supply tank 34 via the pressure medium line 21 and the slave cylinder 33, which is flanged or otherwise secured to the booster device 30. Cylinder 33 is also provided with a tilting valve arrangement.

The booster device according to FIG. 1 operates with a booster piston 35 which is slidably arranged in a cylinder 36. One of the front surfaces of booster piston 35 is constantly applied with atmospheric air pressure or vacuum while the opposite front surface subsequent to the actuation of the valve 27 is applied with pressure by a pressure medium from a second pressure medium supply tank 39. The opposite front surface of piston 35 is subjected to a higher pressure. This causes the booster piston 35 to be displaced, said displacement being transmitted by means of a push rod 37 which is connected with the booster piston 35, on to the actuating piston 38 of the slave cylinder 33, said slave cylinder being flanged or otherwise secured to the booster device and working with a hydraulic or pneumatic pressure medium.

Figure 2:
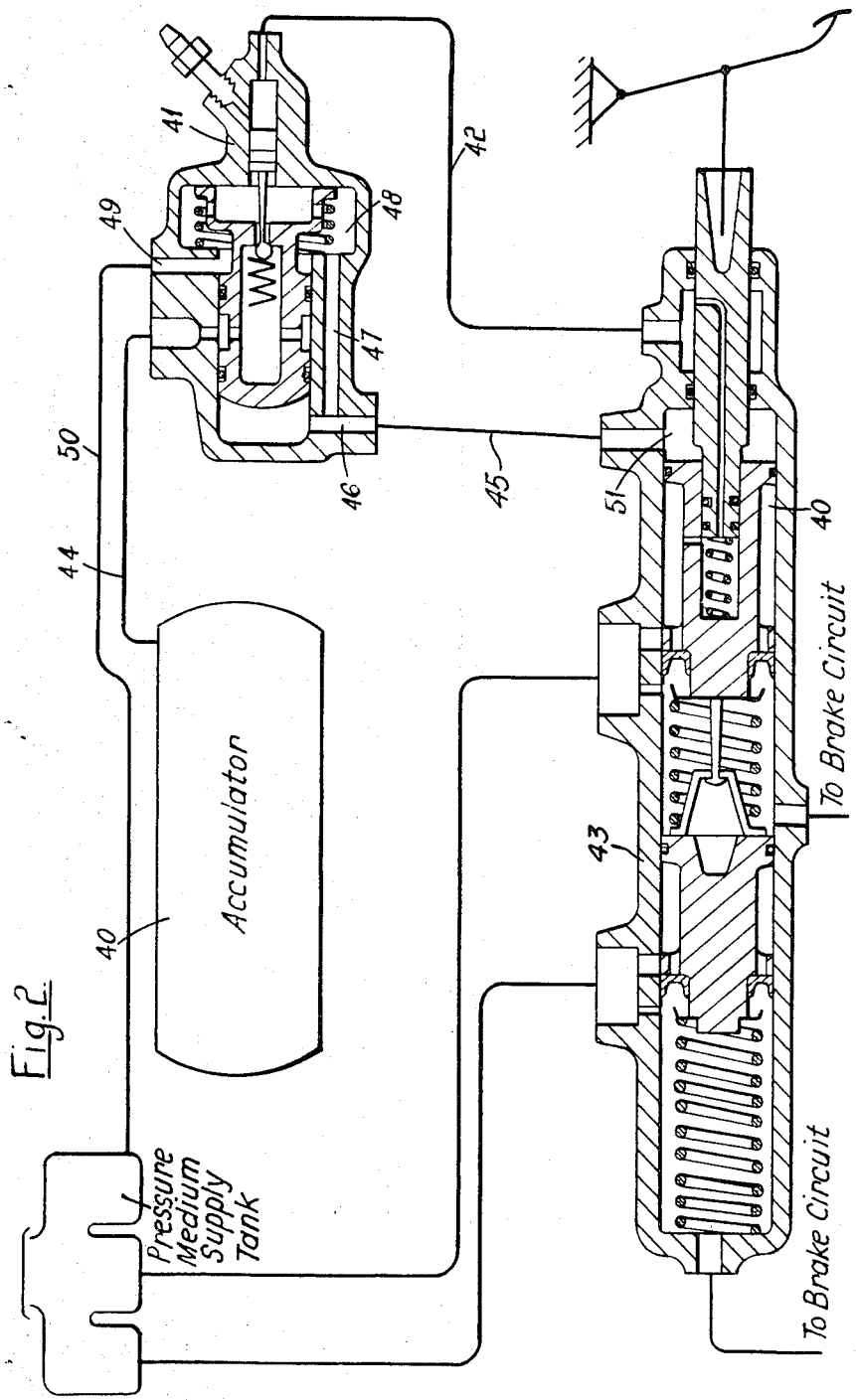
FIG. 2 is a longitudinal cross-sectional view of a booster system in accordance with the principles of the present invention having a booster device designed as a tandem booster device.

The booster device according to FIG. 2 comprises an accumulator 40 containing pressure medium which is fed into the pressure master cylinder 43 via a valve 41. The valve 41 is provided with a duct 49, said duct directing the pressure medium into a supply tank upon release of the brake when the pressure medium subsequently flows back from the cylinder chamber 51 via the pressure medium line 45 and the duct 47 into the annular chamber 48 of the valve 41.

In FIG. 3 the housing of the pressure master cylinder is marked 153, the actuating piston is marked 142 and the pressure medium outlet which is connected with the valve via the pressure medium line 145 is marked 144. The control piston is designed in two pieces and comprises a portion 146 which is smaller in diameter and a portion 147 which is larger in diameter, the latter being actuated via the brake pedal. A spring 148 is disposed between the two portions 146 and 147 of the control piston, said spring separating the pistons 146 and 147 during rest position of the control piston in such a way that the pressure medium cylinder 140 provided in the actuating piston 142 — portion 146 projecting into cylinder 140 — is connected with the pressure medium connection 150 via the bore 149 provided in the piston 146. A pressure medium line 151 is connected with the pressure medium connection 150, said line connecting the pressure master cylinder via the pressure compensating bore in cylinder 140 with a supply tank during rest position of the master cylinder. Upon actuation of the pressure master cylinder the pressure medium line 151 connects the pressure master cylinder with the booster device. A spring 152 is provided in cylinder 140 of actuating piston 142, said spring having one end bearing against piston 146 and its other end bearing against the actuating piston 142. Actuating piston 142 is surrounded by an annular chamber 143, said chamber providing a pressure medium connection from the cylinder 140 to the pressure medium outlet 144 over the entire stroke of the actuating piston 142 via the radial bore 141. A pressure medium line 145 extends from the pressure medium outlet 144 to the valve of the booster device.

FIG. 4 shows a further embodiment of the invention. The pressure medium chamber 205 in front of the actuating piston 203 and the annular duct 213 disposed about the actuating piston 203 are provided with a pressure medium connection 210 and 214, respectively, said connections being arranged in the housing 201 of the pressure master cylinder. This makes it possible to apply the pressure to the chambers connected to these pressure medium connections, such as the pressure medium chamber 205 and the pressure medium cylinder 218, with hydraulic or pneumatic pressure medium independently from one another.

While I have described above the principles of my invention in connection with specific apparatus it is to be more clearly understood that this description is made only by way of example and not as a limitation to the scope of my invention as set forth in the objects thereof and in the accompanying claims.

I claim:

1. A booster system for brake systems in vehicles comprising:
    a brake pedal;
    a pressure master cylinder;
    a booster device having at least one output;
    at least one pressure medium line interconnecting said master cylinder and said booster device; and
    at least one brake circuit coupled to said master cylinder;
    said master cylinder including
        an actuating piston having internally thereof a pressure medium cylinder, and
        a control piston coupled to said brake pedal,
        said actuating piston having pressure applied thereto by at least said output of said booster device in a given direction and simultaneously said control piston is moved by said brake pedal against the pressure medium of said pressure medium cylinder in said given direction to actuate said brake circuit,
        the pressure medium of said pressure medium cylinder being coupled by said one pressure medium line for actuation of said booster device,
        said control piston coming into direct contact with said actuating piston for actuation thereof when at least said booster device fails.

2. A system according to claim 1, wherein said master cylinder further includes
    a spring disposed between said control piston and said actuating piston.

3. A system according to claim 1, wherein said control piston includes
    a small diameter portion extending into said pressure medium cylinder,
    a large diameter portion coupled to said brake pedal, and
    a shoulder interconnecting said small portion and said large portion, said shoulder normally being spaced from said actuating piston, but engaging said actuating piston when at least said booster fails.

4. A system according to claim 1, further including
    a first pressure medium supply tank, an annular duct disposed between said actuating piston and the housing of said master cylinder coupled to said supply tank, and a compensating bore in said actuating piston extending between said pressure medium cylinder and said annular duct.

5. A system according to claim 1, further including a first pressure medium supply tank, a radial port contained in said actuating piston in communication with said pressure medium cylinder and said first supply tank, an axial bore contained in said control piston having one end thereof in communication with said pressure medium cylinder, a radial bore contained in said control piston having one end thereof in communication with the other end of said axial bore, and an annular chamber disposed between said control piston and the housing of said master cylinder in communication with the other end of said radial bore and said one pressure medium line, the closing of said radial port by said control piston enables the pressure medium of said pressure medium cylinder to build up pressure and activate said booster device through said axial bore, said radial bore, said annular chamber and said one pressure medium line.

6. A system according to claim 1, wherein said pressure applied to said actuating piston from said booster device is also applied in a direction opposite to said given direction to said control piston.

7. A system according to claim 1, wherein said control piston includes a first portion extending into said pressure medium cylinder, a second portion coupled to said brake pedal and normally spaced from said first portion, and a spring disposed intermediate said first and second portions, said first portion including a flange thereon normally spaced from said actuating piston, but engaging said actuating piston when at least said booster device fails.

8. A system according to claim 7, further including an axial bore contained in said first portion having one end thereof in communication with said pressure medium cylinder and the other end thereof in communication with said pressure medium cylinder and the other end thereof in communication with said output of said booster device when said first and second portions are separated from each other.

9. A system according to claim 8, further includes a radial bore contained in said actuating piston having one end thereof in communication with said pressure medium cylinder, and an annular chamber disposed between said actuating piston and the housing of said master cylinder in communication with the other end of said radial bore and said one pressure medium line.

10. A system according to claim 1, further including a second pressure medium supply tank, and wherein said pressure applied to said actuating piston is supplied by said second supply tank.

11. A system according to claim 1, wherein said master cylinder is a tandem master cylinder.

12. A system according to claim 1, wherein said master cylinder is a single-circuit master cylinder.

13. A system according to claim 1, wherein said pressure medium of said pressure medium cylinder is a hydraulic pressure medium.

14. A system according to claim 1, wherein said pressure medium of said pressure medium cylinder is a pneumatic pressure medium.

* * * * *